(12) United States Patent  
Ogawa et al.

(10) Patent No.: US 8,482,539 B2  
(45) Date of Patent: Jul. 9, 2013

(54) ELECTRONIC PEN SYSTEM

(75) Inventors: Toshiyuki Ogawa, Fukuoka (JP); Toshihito Tanaka, Saga (JP); Kazuhisa Sakamoto, Fukuoka (JP); Tatsuhito Ueno, Fukuoka (JP); Yuuji Toyomura, Fukuoka (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/987,334

(22) Filed: Jan. 10, 2011

(65) Prior Publication Data  
US 2011/0169756 A1 Jul. 14, 2011

(30) Foreign Application Priority Data

Jan. 12, 2010 (JP) ................................ 2010-004117  
Jan. 12, 2010 (JP) ................................ 2010-004122  
Jan. 12, 2010 (JP) ................................ 2010-004125

(51) Int. Cl.  
*G06F 3/041* (2006.01)

(52) U.S. Cl.  
USPC ........ 345/173; 345/174; 345/179; 178/18.01; 178/19.01

(58) Field of Classification Search  
USPC ................... 345/173–179; 178/18.01–18.09, 178/19.01–19.05; 434/410  
See application file for complete search history.

(56) References Cited

U.S. PATENT DOCUMENTS

2009/0225041 A1* 9/2009 Kida et al. .................... 345/173  
2009/0251434 A1* 10/2009 Rimon et al. ................. 345/173  
2009/0315841 A1* 12/2009 Cheng et al. ................. 345/173

FOREIGN PATENT DOCUMENTS

| JP | 06-19849 | 1/1994 |
|---|---|---|
| JP | 7-160398 | 6/1995 |
| JP | 7-200131 | 8/1995 |
| JP | 2599019 | 1/1997 |
| JP | 2877089 | 1/1999 |
| JP | 2000-172421 | 6/2000 |
| JP | 2008-118301 | 5/2008 |

OTHER PUBLICATIONS

"Software Review, ArtRage 2", PCfan, No. 15, Apr. 2006., with an English language translation of relevant portions.

* cited by examiner

*Primary Examiner* — Amare Mengistu  
*Assistant Examiner* — Premal Patel  
(74) *Attorney, Agent, or Firm* — Greenblum & Bernstein, P.L.C.

(57) ABSTRACT

An electronic pen transmits pen information to a controller corresponding to detection of a touch condition, and thereafter turns ON a connecting switch that disconnects electrical connection between the tip portion and the grip portion of the pen that are provided in a state of being electrically disconnected from each other so as to cause a pen input acceptance state. The controller determines that position detection information is from the electronic pen when the position detection information is received from a position detecting device after the pen information is received from the electronic pen, while the controller determines that position detection information is from a finger when the position detection information is received from the position detecting device without receiving the pen information from the electronic pen.

19 Claims, 22 Drawing Sheets

| Arrow | Black marker | Red marker |
|---|---|---|
| Blue marker | × | Green marker |
| Eraser | Special marker | Special function |

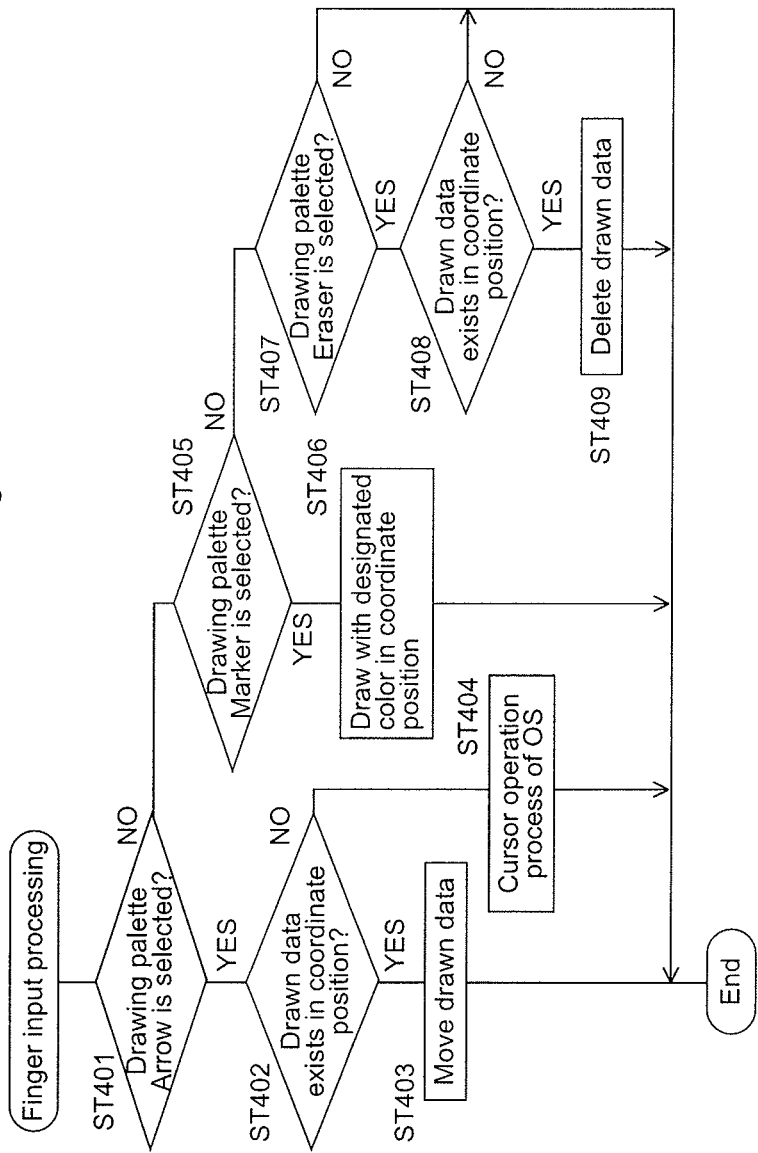

ELECTRONIC PEN SYSTEM

CROSS-REFERENCE TO RELATED APPLICATIONS

The present application claims priority under 35 U.S.C. §119 of Japanese Applications No. 2010-004117, filed on Jan. 12, 2010, No. 2010-004122, filed on Jan. 12, 2010, and No. 2010-004125, filed on Jan. 12, 2010, the disclosures of which are expressly incorporated by reference herein in their entireties.

BACKGROUND OF THE INVENTION

1. Field of the Invention

The present invention relates to an electronic pen system that displays images on a touch surface of a touch panel corresponding to touch operations performed by an electronic pen and a finger to the touch surface.

2. Description of Related Art

An electronic pen system is conventionally known in which electronic pens and a touch panel are combined. In a capacitance type touch panel, a user can perform a touch operation by his/her fingertip as well as by an electronic pen (see Related Art 3, Related Art 4 and Related Art 5).

This kind of electronic pen system has been widely accepted and its use is widespread in the field of a personal computer or a portable information terminal. Further, a technology is known in which a touch panel is combined with a large-screen displaying device so as to be used as an interactive whiteboard for a presentation or a lecture directed at a large audience (see Related Art 1).

In use of this large-sized electronic pen system, it is possible to perform a predetermined operation such as drawing by holding an electronic pen with a hand, and to perform another operation by a finger of the other hand at the same time. It is also possible that while a user performs a predetermined operation by holding an electronic pen, another user who does not hold an electronic pen performs a predetermined operation by his/her finger. The usability can, therefore, be improved by using an electronic pen and a finger separately.

In connection with this demand, a technology is known in which a directing subject that performed a touch operation is identified as either an electronic pen or a finger based on the contact area. Specifically, the directing subject is identified as a finger when the contact area is large, and it is identified as an electronic pen when the contact area is small. (see Related Art 2).

Related Art 1: Japanese Patent Application Publication No. 2008-118301

Related Art 2: Japanese Patent No. 2599019

Related Art 3: Japanese Patent Application Publication No. H06-19849

Related Art 4: Japanese Patent No. 2877089

Related Art 5: Japanese Patent Application Publication No. 2000-172421

SUMMARY OF THE INVENTION

In this identifying method, however, when a small child performs a touch operation, there is a strong likelihood that the directing subject is erroneously identified as an electronic pen. This is a problem especially when it is used as an interactive whiteboard for educational purposes.

When an electronic pen is provided with a switch mechanism to be connected by applying the tip portion of the pen to the touch surface and an operation signal is transmitted to a controlling device corresponding to a touch operation, it is possible to identify the directing subject that performed the touch operation as either the electronic pen or the finger based on whether the operation signal can be received at the time of detecting the touch position by a position detecting device.

However, when the sensitivity of a capacitance type touch panel is increased, the touch position is detected even in a close state where the electronic pen is not in contact with the touch surface. In this case, the touch position is detected by the position detecting device without transmitting the operation signal from the electronic pen. Thus, there is a drawback that the directing subject is erroneously identified as the finger even if the electronic pen is used.

The present invention was made to solve this drawback of the conventional technologies. An object of the present invention is to provide an electronic pen system that can correctly identify the directing subject that performed a touch operation as either the electronic pen or a finger.

An aspect of the electronic pen system has an electronic pen; a touch panel body having a touch surface on which a touch operation is performed by the electronic pen or by a finger; a position detecting device that detects a touch position on the touch surface of the touch panel where the touch operation is performed; and a controller that receives position detection information on the touch position from the position detecting device and determines whether the touch operation is performed by the electronic pen or by the finger. The electronic pen has a grip portion that is grippable by a user's hand; a pen tip portion that is pressed onto the touch surface by a touch operation of the electronic pen; a touch condition detector that detects a touch of the pen tip portion with the touch surface; a pen information transmitter that transmits predetermined pen information to the controller when the touch condition detector detects the touch of the pen tip portion with the touch surface; and a connecting switch that electrically connects the pen tip portion and the grip portion so that the user's hand is brought into electrical continuity with the pen tip portion through the grip portion when the touch condition detector detects the touch of the pen tip portion with the touch surface. The controller determines that the touch operation is performed by the electronic pen when the controller receives the position detection information from the position detecting device after receiving the pen information from the electronic pen, while the controller determines that the touch operation is performed by the finger when the controller receives the position detection information from the position detecting device without receiving the pen information from the electronic pen.

With this, it is possible to correctly identify the directing subject that performed a touch operation as either the electronic pen or a finger.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates an overall configuration of an electronic pen system according to the present invention;

FIG. 5 is a view illustrating a drawing palette displayed on the touch surface by the displaying device shown in FIG. 1;

FIG. 6 is a flowchart showing the finger input processing steps shown in FIG. 3;

DETAILED DESCRIPTION OF THE INVENTION

Figure 2:
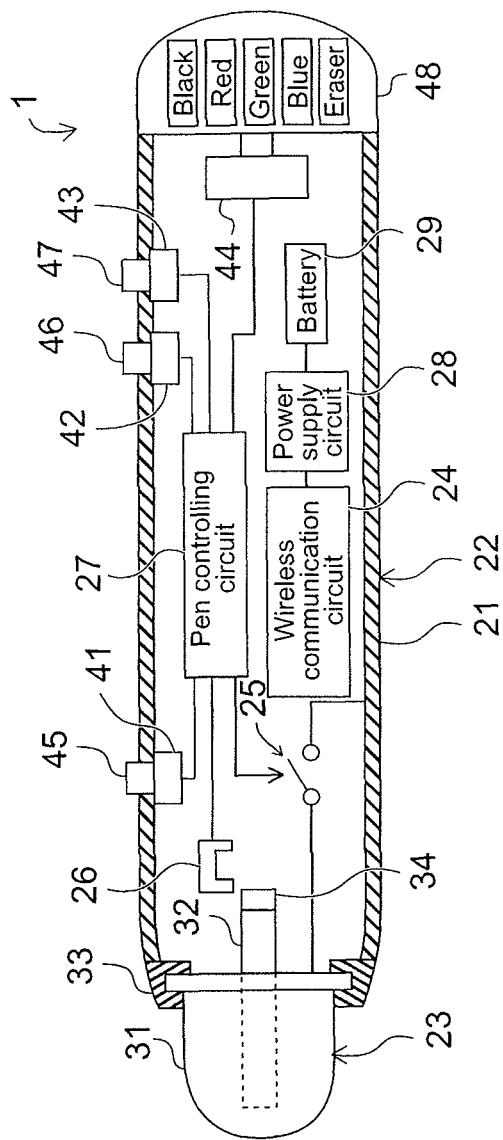
FIG. 2 illustrates a schematic configuration of the electronic pen shown in FIG. 1.

Hereinafter, an embodiment of the present invention is explained with reference to the drawings.

Figure 1:
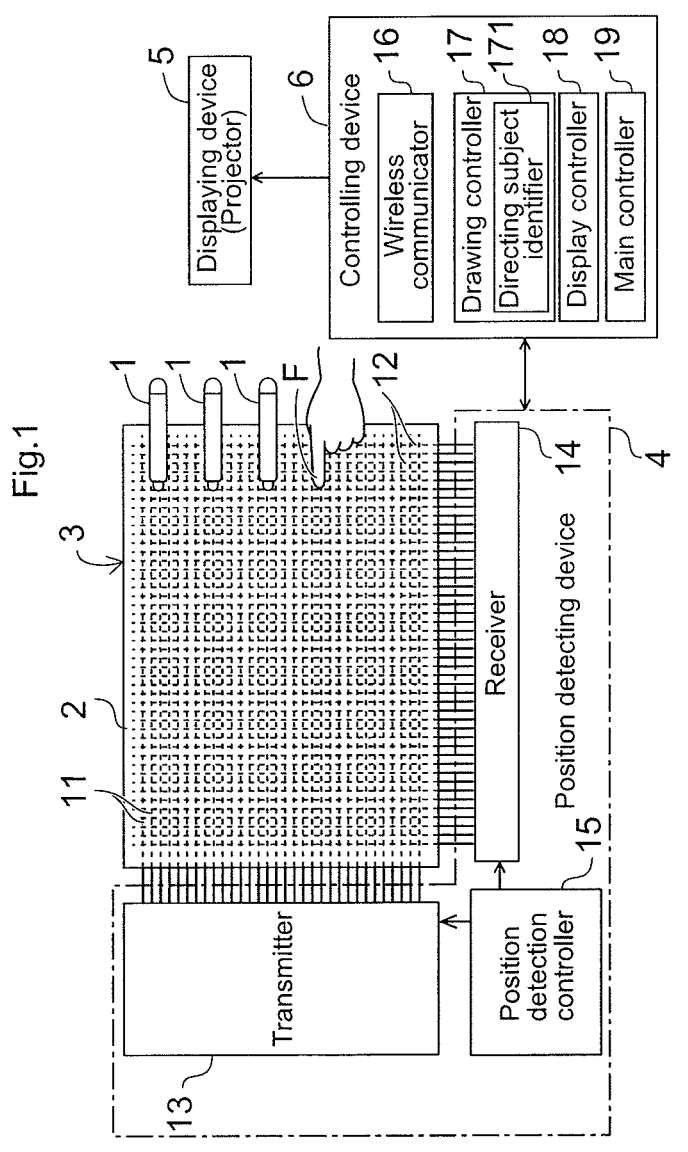

FIG. 1 illustrates an overall configuration of an electronic pen system according to the present invention. The electronic pen system has an electronic pen 1; a touch panel body 3 having a touch surface 2 where a touch operation is performed by the electronic pen 1 or a finger F; a position detecting device 4 that detects a touch position based on variation in the capacitance corresponding to a state of a conductor that is close to or in contact with the touch surface 2; a displaying device 5 that displays a predetermined image on the touch surface 2 as a display screen; and a controlling device 6 that causes the displaying device 5 to display an image corresponding to position detection information obtained from the position detecting device 4 and the property of the electronic pen 1.

The touch panel body 3 is provided with a plurality of transmitting electrodes (first electrodes) 11 arranged parallel with respect to each other; and a plurality of receiving electrodes (second electrodes) 12 arranged parallel with respect to each other. The transmitting electrodes 11 and the receiving electrodes 12 are electrically insulated, and form a grid-shaped pattern. The insulation state between the transmitting electrodes 11 and the receiving electrodes 12 is achieved by placing a sheet-shaped supporting body therebetween.

The position detecting device 4 has a transmitter 13 that applies a driving signal (pulse signal) to the transmitting electrodes 11; a receiver 14 that receives a charge and discharge current signal of the receiving electrodes 12 in response to the driving signal applied to the transmitting electrodes 11 and outputs a level signal per electrode intersection point where the transmitting electrodes 11 and the receiving electrodes 12 intersect (superposed in an insulated state); and a position detection controller 15 that detects a touch position and controls operations of the transmitter 13 and the receiver 14 based on the level signal output from the receiver 14.

The touch panel body 3 is used as an interactive whiteboard in combination with the large-screen displaying device 5 so as to be used for a presentation or a lecture. Specifically, here, the displaying device 5 is a projector, and the touch surface 2 is a screen for the projector. Alternatively, the displaying device 5 may be a liquid crystal display or a plasma display provided on the rear side of the touch panel body, the transmitting electrodes, and the receiving electrodes that are made of a transparent material.

The controlling device 6 has a wireless communicator 16 that performs communication with the electronic pen 1; a drawing controller 17 that draws images such as characters, lines, or shapes based on the position detection information output from the position detecting device 4 corresponding to a touch operation by the electronic pen 1 or a finger F on the touch surface 2; a display controller 18 that generates display screen data based on the output from the drawing controller 17 and outputs the data to the displaying device 5; and a main controller 19 that performs overall control to each of these elements.

The drawing controller 17 performs a process of drawing images corresponding to a touch operation in a drawing mode and a process of deleting images corresponding to a touch operation in an eraser mode. The drawing controller 17 has a directing subject identifier that determines whether the position detection information is from the electronic pen 1 or a finger F when the drawing controller 17 obtains the position detection information from the position detecting device 4, and a drawing process is performed based on the property set in the electronic pen 1 and a finger F, respectively.

The main controller 19 performs processes that are assigned to operation buttons displayed on the display screen in a cursor operation mode corresponding to a touch operation. The controlling device 6 is configured by a personal computer and peripheral equipment. An operating system (OS) is installed to serve as the main controller 19, and an application program is installed to serve as the drawing controller 17.

The transmitting electrodes 11 and the receiving electrodes 12 are provided at the same pitch (for example, 10 mm). Capacitors are formed in the electrode intersection points where the transmitting electrodes 11 and the receiving electrodes 12 intersect. It is possible to detect whether there is a touch operation or not because the capacitance in the electrode intersection point is substantially decreased when a user performs a touch operation through a directing subject.

Specifically, here, a mutual capacitance method is employed. According to this method, charge and discharge current is caused to flow through the receiving electrodes 12 in response to application of a driving signal to the transmitting electrodes 11, and in this state, when the capacitance in the electrode intersection point is varied in response to a touch operation by a user, the charge and discharge current of the transmitting electrodes 12 is varied. The variation amount of the charge and discharge current is converted to a level signal (digital signal) per electrode intersection point in the receiver 14 so as to be output to the position detection controller 15. The touch position is calculated based on the level signal per electrode intersection point in the position detection controller 15. In this mutual capacitance method, it is possible to perform multi-touch detection in which a plurality of touch positions are detected simultaneously.

In synchronization with the timing signal output from the position detection controller 15, the transmitter 13 applies a driving signal to each transmitting electrode 11 selected one by one. The receiver 14 receives the charge and discharge current from each receiving electrode 12 selected one by one while applying a driving signal to one of the transmitting electrodes 11. With this, it is possible to output the charge and discharge current in all the electrode intersection points.

The position detection controller 15 calculates a touch position (coordinate of the center of the touch region) from the level signal per electrode intersection point output by the receiver 14 based on predetermined computing processing. In this computing of the touch position, a touch position is calculated from level signals in a plurality (for example, 4×4) of electrode intersection points adjacent to each other in the X-axis direction (the extending direction of the transmitting electrodes 11) and the Y-axis direction (the extending direction of the receiving electrodes 12), respectively, by using a predetermined interpolation method (for example, centroid method). With this, it is possible to detect a touch position in higher resolution (for example, 1 mm or less) than the pitch (10 mm) of the transmitting electrodes 11 and the receiving electrodes 12.

FIG. 2 illustrates a schematic configuration of the electronic pen shown in FIG. 1. The electronic pen 1 has a pen main body 22 that is provided with a grip portion 21 to be gripped by a user's hand; a pen tip portion 23 to be pressed onto the touch surface 2 at the time of a touch operation; a wireless communication circuit 24 that performs wireless communication with the controlling device 6; a connecting switch 25 that connects and disconnects the pen tip portion 23 and the grip portion 21 provided in a state of being electrically disconnected from each other; a magnetic sensor (touch condition detector) 26 that detects a touch condition of the touch surface 2; and a pen controlling circuit 27 that performs overall control of each element. Electric power is supplied from a battery 29 to the pen controlling circuit 27, the wireless communication circuit 24, and the like, through a power supply circuit 28 as needed. In the present embodiment, the grip portion 21 is made of a conductive resin. However, it may be one that is obtained by coating a metal material or resin with a conductive material, and the conductive material may be selected appropriately so as to achieve electrical continuity at least between the pen tip portion 23 and a human body when a user grips the electronic pen 1 and the connecting switch 25 is turned ON.

The pen main body 22 is made of a synthetic resin material having conductivity. The pen tip portion 23 has a pen tip cover 31 and a pen tip axis 32. The pen tip cover 31 is made of a felt material having conductivity, and the pen tip axis 32 is made of a synthetic resin material having conductivity. The pen tip portion 23 is retained by the pen main body 22 through an insulator 33. The pen tip axis 32 is axially movably supported by a guide member which is not shown in the drawing. When the pen tip portion 23 is pressed onto the touch surface 2 at the time of a touch operation, the pen tip axis 32 is pressed inward due to shrinkage of the pen tip cover 31 made of a felt material.

The magnetic sensor 26 detects displacement of a magnet 34 provided in the pen tip axis 32. When the pen tip axis 32 is pressed inward at the time of a touch operation, the distance between the magnet 34 and the magnetic sensor 26 is varied by the movement of the pen tip axis 32, which makes it possible to detect the touch condition.

The connecting switch 25 is an electronic switch (transistor such as FET), and undergoes on-off control by the pen controlling circuit (switch controller) 27. Regarding the electronic switch, it is preferable that the parasitic capacitance between terminals when the connecting switch 25 is OFF is small. When the capacitance component is large, even if the connecting switch 25 is OFF, a state similar to electrical continuity with a human body is caused. From this viewpoint, the connecting switch 25 may be configured by a contact type relay in which capacitance can substantially be ignored.

Here, when the connecting switch 25 is OFF, the pen tip portion 23 and the grip portion 21 are electrically disconnected from each other. Since the capacitance component of the pen tip portion 23 is extremely small, the position detecting device 4 will not recognize that the electronic pen 1 is close to or in contact with the touch surface 2 even when the pen tip portion 23 comes close to (or is in light contact with) the touch surface 2.

In contrast, when the connecting switch 25 is ON, the pen tip portion 23 and the grip portion 21 are electrically connected, and the user's hand is brought into electrical continuity with the pen tip portion 23 through the grip portion 21. Since a human body has a relatively large capacitance component, when the electronic pen 1 comes close to or is in contact with the touch surface 2, the line of electrical force between the transmitting electrodes 11 and the receiving electrodes 12 (see FIG. 1) is varied, which makes it possible for the position detecting device 4 to surely detect a touch condition of the electronic pen 1.

The electronic pen 1 has push-type operation switches 41-43 and a rotary-type operation switch 44. The push-type operation switches 41-43 cause the pen controlling circuit 27 to perform the operations assigned to each of the operation switches 41-43 by pressing operation buttons 45-47 downward (i.e. inwardly). For example, a similar function to a mouse button is assigned to the first operation switch 41, and functions to scroll the display screen in a feed direction and a reverse direction can be assigned to the second and third operation switches 42 and 43.

The rotary-type operation switch (property selector) 44 changes the property of the function of the electronic pen 1 by rotating an operation knob 48. Specifically, here, it is possible to select black, red, green, or blue as a drawing color in a drawing mode, or an eraser mode by the operation switch 44. Another structure is possible in which the property of another function can be selected.

The pen controlling circuit 27 stores unique pen identification information (ID). Further, the pen controlling circuit 27 determines whether or not there is a touch condition based on the output of the magnetic sensor 26 so as to generate status information, and generates property information corresponding to operation of the operation switch 44. The pen information, including the pen identification information, the status information, and the property information is transmitted from the wireless communication circuit 24 (pen information transmitter) to the controlling device 6. For example, 2.4 GHz band advanced low-power data communication is employed in the wireless communication circuit 24. However, other wireless communication systems and methods can of course be utilized.

Figure 3:
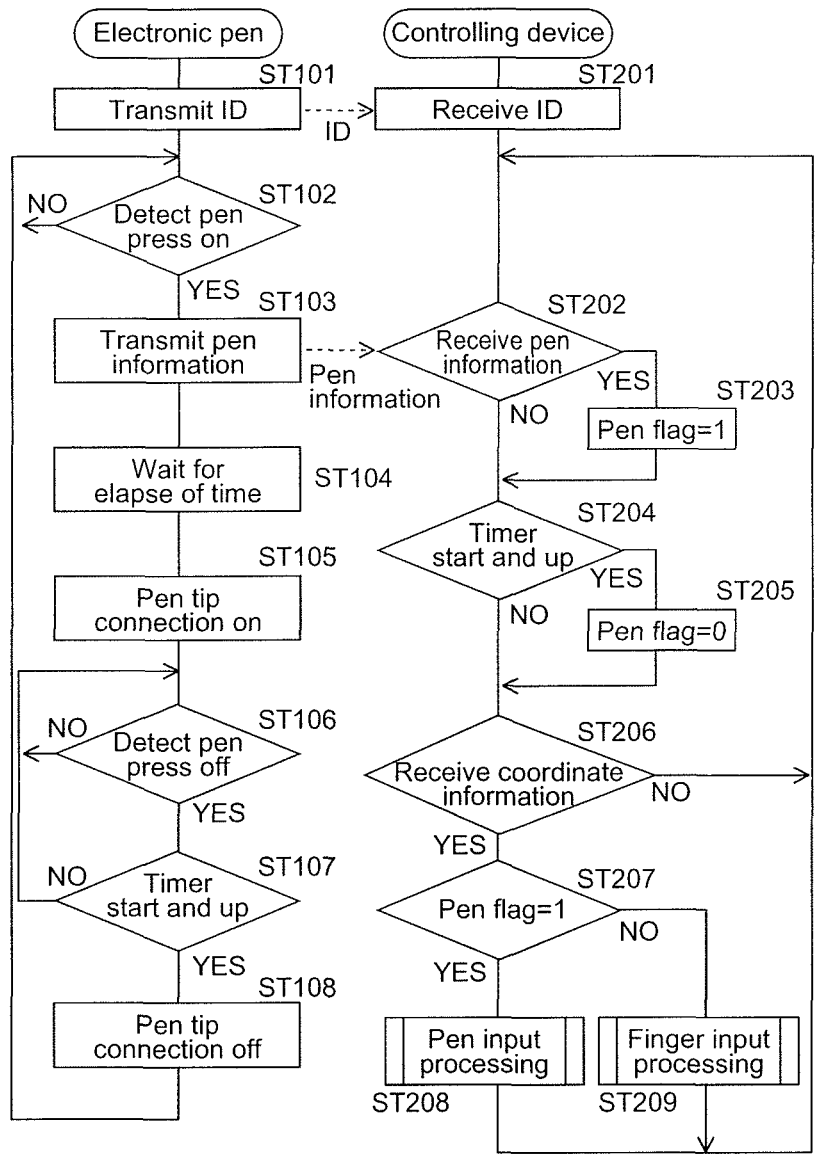
FIG. 3 is a flowchart showing processing steps in the electronic pen and the controlling device shown in FIG. 1.

FIG. 3 is a flowchart showing processing steps in the electronic pen 1 and the controlling device 6 shown in FIG. 1. When the electronic pen 1 is turned on, pen information including pen identification information is transmitted to the controlling device 6 (ST101). The controlling device 6 recognizes the electronic pen 1 currently in use by receiving pen information from the electronic pen 1 at the time of starting up of the electronic pen 1 (ST201). In the electronic pen 1, when a user performs a touch operation and the pen tip portion 23 is pressed onto the touch surface 2, the magnetic sensor 26 detects the touch condition (Yes in ST102). After the pen information is transmitted from the wireless communication circuit 24 to the controlling device 6 corresponding to the detection of the touch condition (ST103), the connecting switch 25 is turned on so as to cause a pen input acceptance state to occur (ST105).

When the pen information is received from the electronic pen 1 (Yes in ST202), the pen flag is set to 1 (ST203). When the pen information is not received from the electronic pen 1 (No in ST202) or after ST203, it is determined whether a timer counts until a predetermined time period elapses (ST204). If Yes in ST204, the pen flag is set to 0 (ST205). If No in ST204 or after ST205, it is determined whether the controlling device 6 receives position detection information from the position detecting device 4 (ST206). If Yes in ST206, it is determined whether the pen flag is 1 or 0 (ST207). If the pen flag is 1 (Yes in ST207), the controlling device 6 determines that the position detection information is from a touch operation by the electronic pen 1 and proceeds to pen input processing (ST208). If the pen flag is 0 (No in ST207), the controlling device 6 determines that the position detection information is from a touch operation by a finger F and proceeds to finger input processing (ST209).

In the electronic pen 1, after a predetermined period of time (for example, 500 ms) passes since the magnetic sensor 26 detects a touch condition (ST104), the connecting switch 25 is turned ON (ST105). With this, it is possible to surely avoid a situation where the timing for receiving the pen information from the electronic pen in the controlling device 6 and the timing for receiving the position detection information from the position detecting device 4 in the pen input acceptance state are reversed.

Further, in the electronic pen 1, the connecting switch 25 is turned off when a non-touch condition detected by the magnetic sensor 26 continues for a predetermined period of time (for example, 2 sec.) (Yes in ST107). With this, it is possible to prevent transmission of the pen information and on-operation of the connecting switch 25 from being repeated frequently corresponding to touch operations by a user.

Incidentally, the pen information including the pen identification information, the status information, and the property information may be transmitted to the controlling device 6 at any time, for example, by pressing the operation switch 41 downward. When the controlling device 6 receives the pen information from the electronic pen 1, the controlling device 6 causes the displaying device 5 to display the property of the electronic pen 1 such as a drawing color in the drawing mode on the touch surface 2. With this, it is possible for a user to appropriately recognize the property set in the electronic pen 1.

Figure 4:
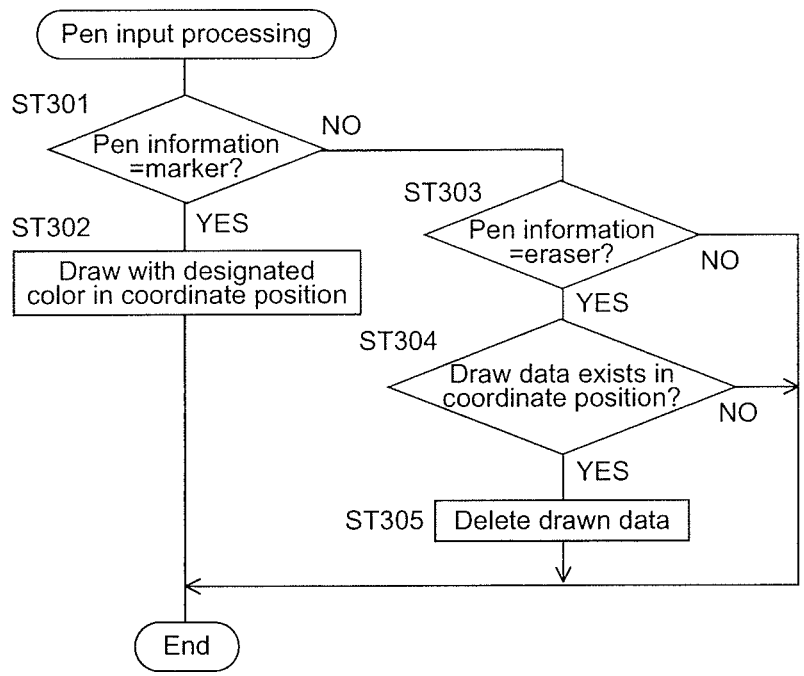
FIG. 4 is a flowchart showing the pen input processing steps shown in FIG. 3.

FIG. 4 is a flowchart showing the pen input processing steps shown in FIG. 3. When the property of the pen information is "marker" (Yes in ST301), a drawing process with a designated color is performed in the coordinate position (ST302). When the property of the pen information is "eraser" (Yes in ST303) and drawn data exists in the coordinate position (Yes in ST304), a deleting process is performed to the drawn data (ST305).

FIG. 5 illustrates a drawing palette displayed on the touch surface 2 by the displaying device 5 shown in FIG. 1. For finger input, the input property is selected by the drawing palette. Here, selection boxes for "arrow" (cursor), "marker" of each color including black, red, blue, and green, "eraser", "special marker", and "special function" are displayed to be selected by a touch operation with a finger F. When "special marker" or "special function" is selected, a sub menu to select specific functions is displayed. "Special marker" has functions such as a highlighter or a function of laying out optional shapes and drawing lines. "Special function" can include a loupe function of enlarging a part of the display screen, a spotlight function of darkening the display screen with a part of the display screen left as it is, or a shade function of hiding a part of the display screen. Of course, other "Special markers" and "Special functions" can also be provided.

FIG. 6 is a flowchart showing the finger input processing steps shown in FIG. 3. When "arrow" is selected in the drawing palette (Yes in ST401) and drawn data exists in the coordinate position (Yes in ST402), a process of moving the drawn data corresponding to movement of a finger F is performed (ST403). When no drawn data exists in the coordinate position (No in ST402), the processing proceeds to a cursor operation process of the OS such as menu selection (ST404). Alternatively, when "marker" is selected in the drawing palette (Yes in ST405), a drawing process with a designated color is performed in the coordinate position (ST406). Further, when "eraser" is selected in the drawing palette (Yes in ST407) and drawn data exists in the coordinate position (Yes in ST408), a deleting process is performed to the drawn data (ST409).

FIG. 6 shows an example in which three functions including "arrow", "marker", and "eraser" are selected in the drawing palette. However, when there are more choices like the example shown in FIG. 5, the flow will have more steps corresponding to these choices.

Figure 7A:
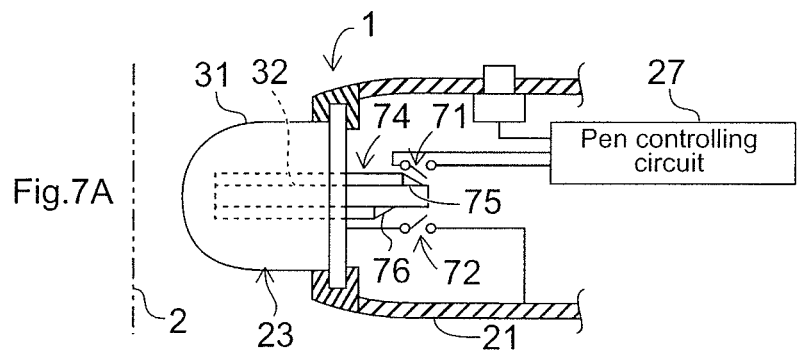
FIGS. 7A-7C illustrate a schematic configuration of another embodiment of the electronic pen shown in FIG. 1.
Figure 7B:
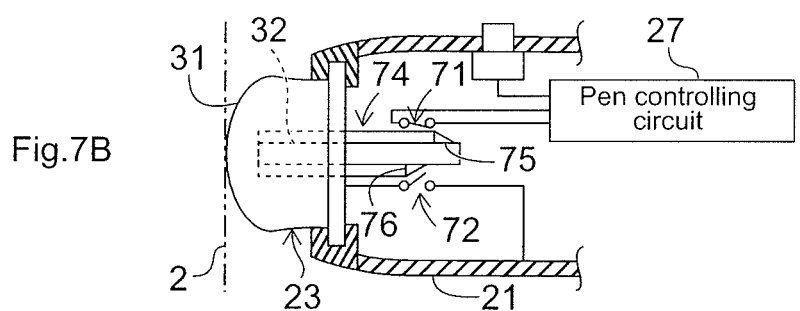
Figure 7C:
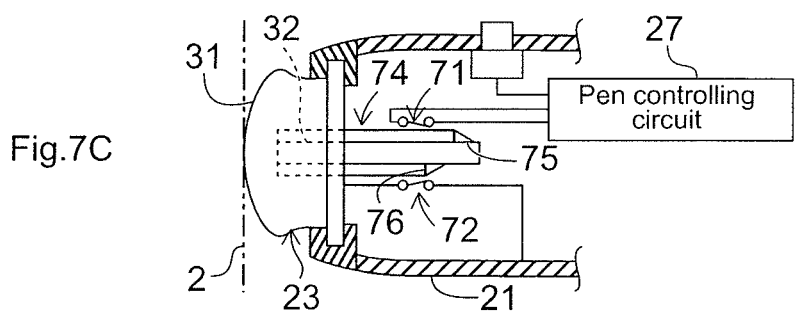

FIGS. 7A-7C illustrate a schematic configuration of another embodiment of the electronic pen 1 shown in FIG. 1. FIGS. 7A-7C show operation status step-by-step. Here, the electronic pen 1 is provided with a first mechanical switch 71 that detects a touch condition; a second mechanical switch 72 that serves as a connecting switch for disconnecting electrical connection between the pen tip portion 23 and the grip portion 21; and a switch operating mechanism 74 that controls on-off of the first mechanical switch 71 and the second mechanical switch 72 in conjunction with displacement of the pen tip portion 23 at the time of a touch operation.

The switch operating mechanism 74 has a first switch operating section 75 that controls on-off of the first mechanical switch 71; and a second switch operating section 76 that controls on-off of the second mechanical switch 72. The first switch operating section 75 and the second switch operating section 76 are provided in the pen tip axis 32 so as to be axially displaced from each other.

With this, the first mechanical switch 71 and the second mechanical switch 72 are turned on in sequence corresponding to retracting displacement of the pen tip portion 23 in response to pressing the pen tip portion 23 onto the touch surface 2. Specifically, when the pen tip portion 23 is pressed onto the touch surface 2 in a non-touch condition shown in FIG. 7A and then further pressed so that the axis 32 is retracted, the first mechanical switch 71 is turned on as shown in FIG. 7B and thereafter the second mechanical switch 72 is turned on as shown in FIG. 7C.

With this mechanical structure, it is possible to eliminate a timer circuit (which is not shown in the drawing) and the like of the pen controlling circuit 27, and also prevent the battery from being consumed by operation of such an element. Further, by appropriately determining the distance of the first switch operating section 75 and the second switch operating section 76, it is possible to surely avoid a situation where the timing for receiving the pen information from the electronic pen 1 in the controlling device 6 and the timing for receiving the position detection information from the position detecting device 4 in the pen input acceptance state are reversed.

Figure 8:
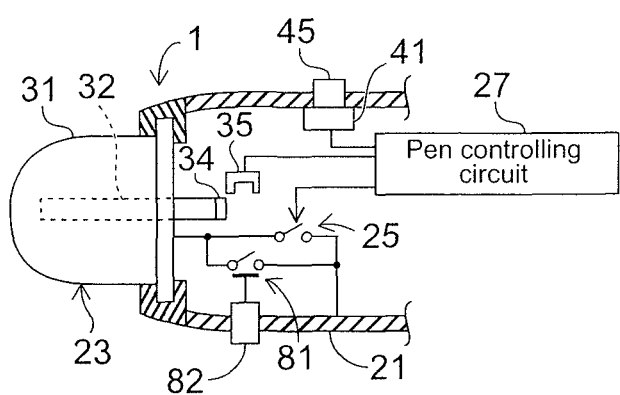
FIG. 8 illustrates a schematic configuration of another embodiment of the electronic pen shown in FIG. 1.

FIG. 8 illustrates a schematic configuration of another embodiment of the electronic pen shown 1 in FIG. 1. Here, there are provided a mechanical switch 81 that serves as a connecting switch for disconnecting electrical connection between the pen tip portion 23 and the grip portion 21; and an operating button (operating unit) 82 that always keeps the mechanical switch 81 on by a user's operation. The operating button 82 has an alternate-type structure in which the mechanical switch 81 is kept in either one of an ON-state and an OFF-state, and a user's operation forcibly controls on-off of the mechanical switch 81. With this, the electronic pen 1 can be used as an alternative to a finger F even in a state of low battery charge. Other components are similar to the embodiment of FIG. 2, and a detailed description is omitted. Incidentally, a forcible connecting switch may similarly be provided in the structure shown in FIG. 7.

Figure 9:
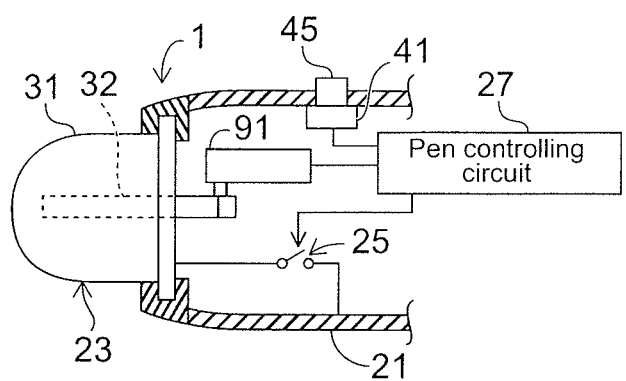
FIG. 9 illustrates a schematic configuration of another embodiment of the electronic pen shown in FIG. 1.

FIG. 9 illustrates a schematic configuration of another embodiment of the electronic pen 1 shown in FIG. 1. Here, there is provided a position sensor (displacement amount detector) 91 that detects a displacement amount of the pen tip portion 23 corresponding to pressing the pen tip portion 23 onto the touch surface so as to detect a touch condition. The electronic pen 1 transmits pen information, to which the displacement amount of the pen tip portion 23 detected by the position sensor 91 is added, to the controlling device 6. The controlling device 6 performs a predetermined process corresponding to the displacement amount of the pen tip portion 23 obtained by receiving the pen information from the electronic pen 1. As for the position sensor 91, a variable resistance potentiometer where the resistance value varies depending on the movement amount, an optical position sensor (PSD: Position Sensitive Detector), and the like may be used. Other components are similar to the embodiment of FIG. 2, and a detailed description is omitted.

With this, it is possible for a user to perform various kinds of operations by adjusting the writing pressure that varies the displacement amount of the pen tip portion 23. For example, the line thickness in a line drawing mode may be adjusted based upon the writing pressure. Further, the displacement amount of the pen tip portion 23 may be classified into graduated levels, and the property such as the kind of a line (solid line, broken line, dashed-dotted line) may be selected corresponding to each level. Furthermore, a different process may be assigned to each level in such a manner that selection of a displayed object is performed in level 2 and determination of an operation is performed in level 5.

The pen tip portion 23 returns to an initial state as the pen tip portion 23 is separated from the touch surface 2 due to the elasticity of the pen tip cover 31 made of a felt material and the elasticity of a rubber material (which is not shown in the drawing) interposed between the pen tip axis 32 and the pen main body 22. The pen tip portion 23 can be displaced in an amount corresponding to the writing pressure due to these elastic forces.

Figure 10:
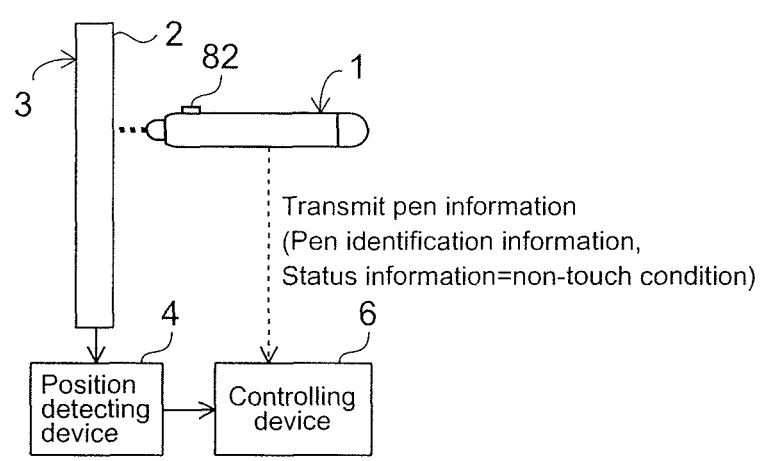
FIG. 10 is a diagram illustrating an example of a non-contact mode of the electronic pen shown in FIG. 1.

FIG. 10 is a diagram illustrating an example of a non-contact mode of the electronic pen 1 shown in FIG. 1. When a capacitance type is employed as described above, the position of electronic pen 1 can be detected in a state where the electronic pen 1 is close to the touch surface 2 without being in contact with the touch surface 2.

Consequently, in the structure where the operating button 82 is provided to forcibly control on-off of the mechanical switch 81 that serves as a connecting switch for disconnecting electrical connection between the pen tip portion 23 and the grip portion 21, and pen information is transmitted corresponding to operation of the operating button 82, as in the embodiment shown in FIG. 8, when the electronic pen 1 is caused to come close to the touch surface 2 by performing ON-operation of the operating button 82, the controlling device 6 receives position detection information from the position detecting device 4, and the controlling device 6 also receives pen information showing a non-touch condition from the electronic pen 1. In this instance, the touch position is detected while the pen information is in a non-touch condition, and therefore, it is different from a normal pen input mode.

Thus, operation in a non-touch condition may be treated as a non-contact mode and a special function may be assigned thereto. Specifically, operation of an application such as a special menu display, or drawing in an air brush mode may be performed. In this instance, in order to avoid confusion with finger input, a state where finger input is prohibited may be set.

Figure 11:
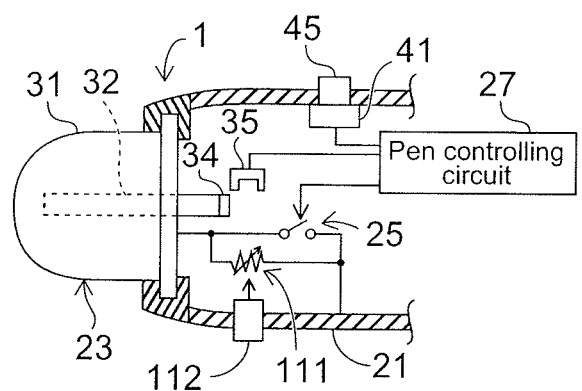
FIG. 11 illustrates a schematic configuration of another embodiment of the electronic pen shown in FIG. 1.

FIG. 11 illustrates a schematic configuration of another embodiment of the electronic pen shown in FIG. 1. Here, the pen tip portion 23 and the grip portion 21 are connected by a variable resistance element 111, and an operation switch 112 is provided to vary the resistance value of the variable resistance element 111. Other elements are similar to the embodiment of FIG. 2, and a detailed description is omitted. Incidentally, a variable capacitance element may be used instead of the variable resistance element 111.

With this structure, it is possible to vary the value of the level signal output from the position detecting device 4 by increasing or decreasing the variation in the resistance of capacitance corresponding to a touch operation in the non-contact mode shown in FIG. 10. The operation amount of the operation switch 112 is transmitted to the controlling device 6, and various kinds of operations such as changing the amount of image processing are performed by the operation amount of the operation switch 112. More specifically, a structure is possible in which a radius for drawing is increased in an air brush mode as the sensitivity of the touch panel becomes high, that is, as the detection level or the detection range of the touch panel becomes great.

Figure 12:
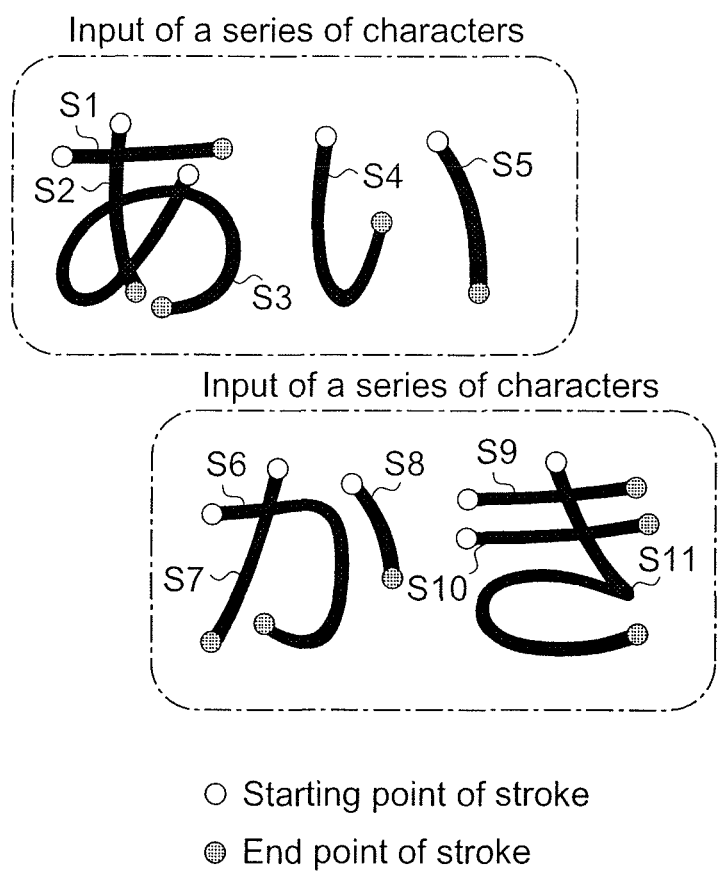
FIG. 12 shows an example of handwriting input in the electronic pen system shown in FIG. 1.
Figure 13:
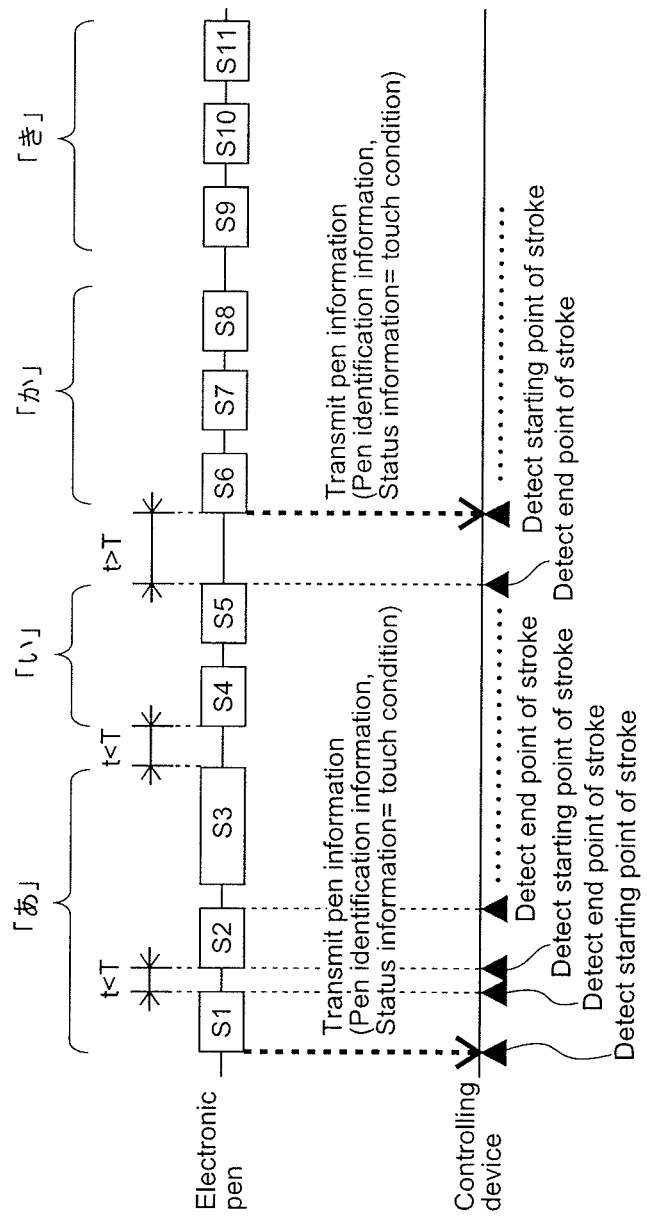
FIG. 13 is a timing chart showing a transmission status of pen information at the time of the handwriting input shown in FIG. 12.

FIG. 12 shows an example of handwriting input in the electronic pen system shown in FIG. 1. FIG. 13 is a timing chart showing transmission status of pen information at the time of the handwriting input shown in FIG. 12. In order to input a series of characters by handwriting, stroke inputs S1-S11 are repeated at short intervals. However, when the electronic pen 1 performs wireless communication of pen information every time a touch condition is caused at the starting point of each stroke S1-S11, the battery 29 is consumed quickly.

Thus, the electronic pen 1 does not transmit pen information when, after the detection results by the magnetic sensor 26 changes a touch condition to a non-touch condition, another touch condition is detected before the non-touch condition continues for a predetermined period of time (T: for example, 2 seconds). Rather, pen information is transmitted only after a non-touch condition greater than the predetermined period of time (i.e. t>T). With this, it is possible to reduce the number of times of communication by the electronic pen 1, and prevent the battery 29 from being consumed.

When a string of characters are input by the same directing subject (electronic pen 1 or finger F), the intervals of the stroke inputs are short. However, when a string of characters are input by different directing subjects separately, the interval between the last stroke input of the character string by one directing subject and the first stroke input of the character string by another directing subject becomes long. By appropriately determining a reference time (T: for example, 2 seconds), therefore, it can be arranged that pen information is not transmitted while the character string is input by a single directing subject, and that pen information is transmitted when input of the character string by a directing subject starts after input of the character string by another directing subject.

In the embodiment shown in the drawing, for example, the Japanese character string "あい" and the Japanese character string "かき" are input by different directing subjects separately. Pen information is transmitted only at a time of the starting point of the first stroke in each of the character strings of "あい" and "かき" (i.e., time of the beginning of S1 and S6 in FIG. 13).

In this instance, the controlling device 6 does not receive pen information from the electronic pen 1 in the second and subsequent stroke inputs. The controlling device 6, therefore, cannot determine whether each stroke input is by the electronic pen 1 or a finger F based on existence or nonexistence of pen information. Likewise, the controlling device 6 cannot determine which electronic pen input each stroke based on pen identification included in pen information.

Thus, when the controlling device 6 detects a starting point of a new stroke input after it detects an end point of a stroke input, the controlling device 6 determines that the new stroke input was performed by the same directing subject which performed a proximate stroke input in a case where the two stroke inputs satisfy predetermined proximity conditions (for example, in the range of ±50 mm).

Here, the proximity conditions are set based on either one or both of the elapsed time from detection of an end point of a stroke input to detection of a starting point of a new stroke input and the distance (i.e., spacing) between an end point of a stroke input and a starting point of a new stroke input. When the proximity conditions are satisfied, it is possible to determine that a single directing subject continuously inputs a character string. When the proximity conditions are not satisfied, it is possible to determine that a user might have changed the directing subject to input another character string.

With this, it is possible to accurately identify the directing subject of each stroke input without transmitting the pen information every time a touch condition is caused.

When there is no previous stroke input that satisfies predetermined proximity conditions, a confirmation screen where a user designates a directing subject is displayed on the touch surface 2 by the displaying device 5. Alternatively, in order to cause the electronic pen 1 to re-transmit the property information, the displaying device 5 performs a display that requests a user to separate the electronic pen 1 from the touch surface 2 over a predetermined period of time (for example, 2 seconds). Also, there may be provided a specific designator (such as a push switch) that particularly causes the electronic pen 1 to transmit the property information. With this, it is possible to designate a directing subject of a stroke input, and to input appropriate characters based on the property of the directing subject.

These operations that a directing subject is determined based on predetermined proximity conditions and a confirmation screen where a user designates a directing subject is displayed when a directing subject cannot be determined are not limited to a case of inputting characters by handwriting as described above. These operations can be applied to a case where a directing subject cannot be determined when inputting other than characters is performed.

Figure 14:
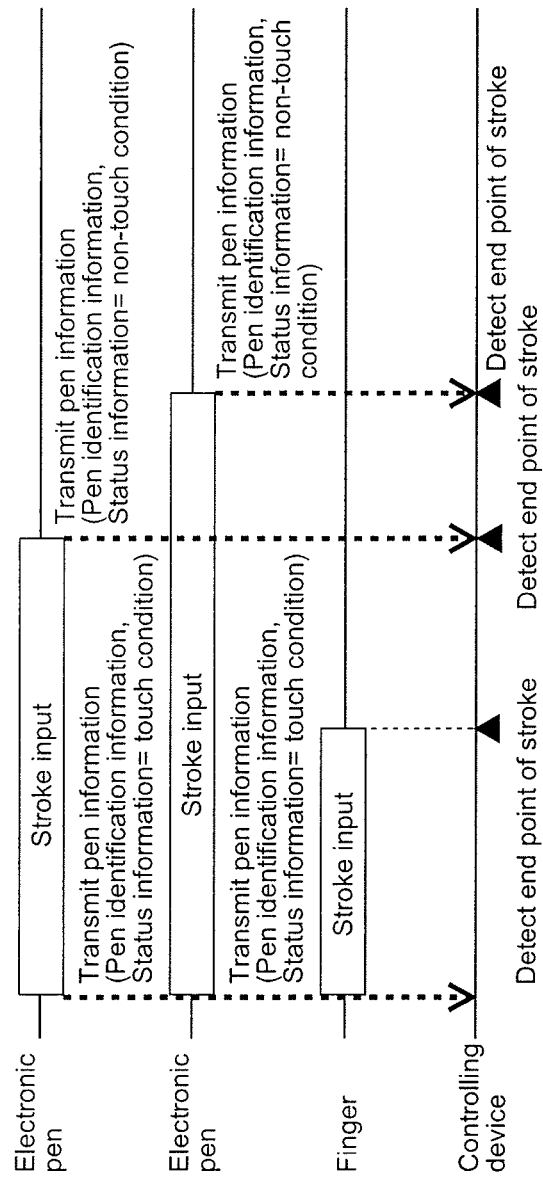
FIG. 14 is a timing chart showing a transmission status of pen information at the time of the handwriting input in the electronic pen system shown in FIG. 1.

FIG. 14 is a timing chart showing transmission status of pen information at the time of the handwriting input in the electronic pen system shown in FIG. 1. The electronic pen 1 transmits pen information including pen identification information and status information (non-touch condition) to the controlling device 6 when the pen tip portion 23 is separated from the touch surface 2 after completion of one stroke input and thereby the detection results by the magnetic sensor 26 changes from a touch condition to a non-touch condition.

The controlling device 6 receives position detection information that gradually changes from the position detecting device 4 during a stroke input, and the controlling device 6 detects an end point of a stroke input where a series of position detection information ends when the pen tip portion 23 of the electronic pen 1 or a finger F is separated from the touch surface after completion of a stroke input. When the controlling device 6 detects an end point of a stoke input substantially at the same time as it receives pen information showing a non-touch condition from the electronic pen 1, the controlling device 6 determines that the stroke input is by the electronic pen 1. When the controlling device 6 does not receive pen information from the electronic pen 1 at the time of detecting an end point of a stroke input, the controlling device 6 determines that the stroke input is by a finger F.

When the timings of starting points of stroke inputs by electronic pen 1 and a finger F are simultaneous, it is impossible to determine whether each stroke input is by either of the electronic pen 1 or a finger F based on the pen information alone that is transmitted from the electronic pen 1 to the controlling device 6 at the time of the starting point of the stroke input. By transmitting pen information in an end point of a stroke input as well, however, it becomes possible to determine that each stroke input is by either the electronic pen 1 or a finger F.

Also, when the timings of starting points of stroke inputs by a plurality of electronic pens 1 overlap, it is impossible to determine whether each stroke input is by either of the electronic pen 1 or a finger F based on the pen information alone that is transmitted from the electronic pen 1 to the controlling device 6 at the timing of the starting point of the stroke input. By transmitting pen information at an end point of a stroke input as well, however, it becomes possible to determine that each stroke input is by which one of the electronic pens 1.

There happens to be a case where a directing subject cannot be determined by the pen information transmitted from the electronic pen 1 to the controlling device 6 at the timings of starting points and end points of stroke inputs when the timings of both starting points and end points of stroke inputs overlap. In such a case, analogical determination may be performed based on information of the directing subject of another stroke input that is close in terms of the position and the time when a plurality of stroke inputs are continuously performed. In contrast, when it is a single stroke input, a confirmation window to ask the user which of the electronic pen 1 and the finger F performed the stroke input may be displayed on the touch surface in the vicinity of the position where the stroke input was performed, and the directing subject of the stroke input may be determined based on the user's indication.

Figure 15:
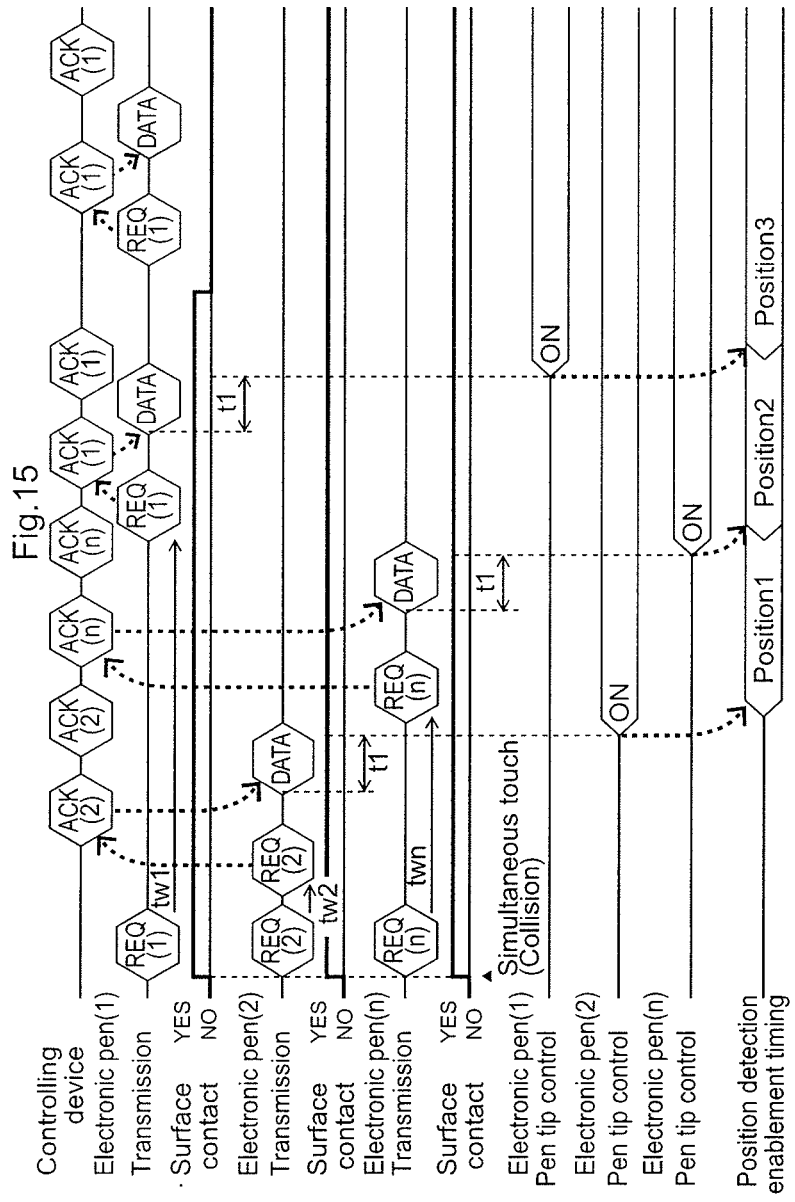
FIG. 15 is a timing chart illustrating simplified operations of a plurality of electronic pens and the controlling device shown in FIG. 1.

FIG. 15 is a timing chart simplifying operations of a plurality of electronic pens 1 and the controlling device 6 shown in FIG. 1. In this embodiment, touch operations are performed simultaneously by a plurality of electronic pens 1.

The electronic pen 1 transmits a communication request signal (REQ(1), REQ(2), . . . REQ(n)) to the controlling device 6 when the pen tip portion 23 is pressed onto the touch surface 2 and the touch condition is detected. The controlling device 6 transmits an acknowledgement signal (ACK(1), ACK(2), . . . ACK(n)) to each of the electronic pens 1 in response to the communication request signal (REQ) the controlling device 6 received from the electronic pen 1. The electronic pen 1 transmits the pen information (DATA) in response to the acknowledgement signal (ACK) the electronic pen 1 received from the controlling device 6.

The electronic pen 1 turns on the connecting switch 25 that disconnects electrical connection between the pen tip portion 23 and the grip portion 21 after a predetermined period of delay time (t1) passes since the transmission of the pen information (DATA) starts. With this, each of the electronic pens 1 is brought into a state where the position can be detected, and the touch position (position 1, position 2, position 3) of each electronic pen 1 is detected in sequence.

Here, distributed-control-type contention (CSMA→T1→independent waiting time (random number)→ data transmission→ACK), which is known in wireless LAN and the like, is used so as to avoid collision of communication. For example, each of the electronic pens 1 performs CSMA (Carrier Sense Multiple Access) for confirming that no wireless channel is in use. When collision occurs due to simultaneous communication requests from a plurality of electronic pens, the following series of communication operations are performed as shown in FIG. 15, specifically, each electronic pen 1 waits for a different period of independent waiting time (tw1, tw2, twn) that is determined by waiting unit time and a generated random number, and thereafter transmits a communication request again so as to avoid the collision; each electronic pen 1 forwards data in response to an acknowledgement signal ACK from the controlling device 6; and the controlling device 6 transmits an acknowledge signal ACK, that acknowledges the receipt of the data, back to the electronic pen 1 in response to the request of the electronic pen 1 every time. Further, although it is not shown in the drawing, when the electronic pen 1 cannot receive an acknowledgement signal ACK from the controlling device 6 after it forwards data, the electronic pen 1 repeats forwarding of data until it receives an acknowledgement signal ACK so as to make sure that the data is forwarded.

With this, the property information of each of a plurality of electronic pens 1 can securely be transmitted to the controlling device 6. Thus, for example, four users can use a different electronic pen 1, respectively, and select a drawing color to be used arbitrarily (that is, independently). Specifically, the drawing color of each electronic pen 1 may be different per user such as black, red, blue, or green, or all the users may select the same drawing color. The property information of the electronic pen 1 is not limited to a drawing color, and the property information may be related to a solid or broken line, or thickness of a line, for example. As described above, the property information of the electronic pen 1 of this embodiment can be set separately and independently even when a plurality of electronic pens 1 are used simultaneously, and there is no restriction due to the usage of another electronic pen 1.

Also, since it is possible to correctly identify the directing subject that performed a touch operation as either the electronic pen 1 or a finger F as described above, it becomes possible to perform various kinds of operations by imparting different functions to the electronic pen 1 and a finger F. Here, an explanation will be made for an example where editing (moving, rotating, enlarging, and shrinking) of a displayed object is performed by a touch operation with the electronic pen 1 and a finger F.

Figure 16:
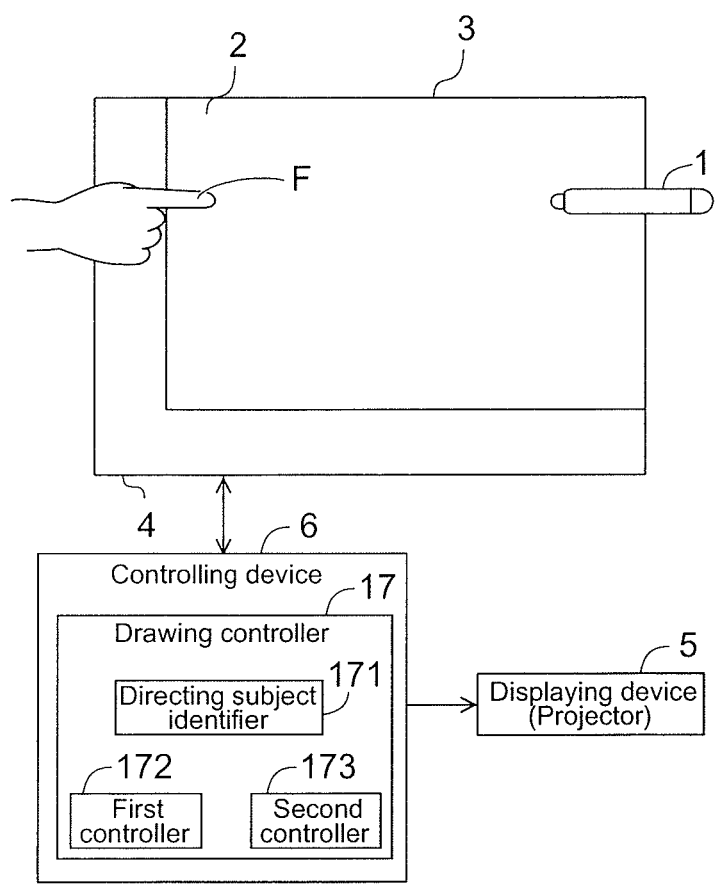
FIG. 16 illustrates a schematic configuration of the drawing controller of the controlling device shown in FIG. 1.

FIG. 16 illustrates a schematic configuration of the drawing controller 17 of the controlling device 6 shown in FIG. 1. The drawing controller 17 of the controlling device 6 has a directing subject identifier 171 that identifies the directing subject that performed a touch operation as either the electronic pen 1 or a finger F; a first controller 172 that performs predetermined pen input processing corresponding to a touch operation by the electronic pen 1; and a second controller 173 that performs predetermined finger input processing corresponding to a touch operation by a finger F. The pen input processing of the first controller 172 and the finger input processing of the second controller 173 are performed in parallel. With this, it is possible to divide the functions between the electronic pen 1 and a finger F, and cause the electronic pen 1 and a finger F to concurrently and in parallel perform processing according to the functions allotted to the electronic pen 1 and a finger F in advance.

As described above, the controlling device 6 is configured as a personal computer and peripheral equipment, and the function of the drawing controller 17 is achieved by running an application program. Therefore, "perform in parallel" refers to parallel processing of the OS by multi-task processing.

The first controller 172 performs a drawing process corresponding to a touch operation by the electronic pen 1 and the property set in the electronic pen 1. The second controller 173 performs an editing process to a displayed object corresponding to a touch operation by a finger F. Other functions may be assigned to the first controller 172 and the second controller 173.

The drawing controller 17 of the controlling device 6 has a finger drawing mode in which a touch operation by a finger F is considered as one by the electronic pen 1 in response to a user's command, and the first controller 172 performs a drawing process corresponding to a touch operation by a finger F based on the standard property in the finger drawing mode. With this, it is possible to perform drawing by a touch operation with a finger F as an alternative to the electronic pen 1.

In the finger drawing mode, a drawing process corresponding to a touch operation with a finger F is performed based on the standard property. As for the standard property, a drawing color is black, for example. In the finger drawing mode, operation of the second controller 173 is stopped.

Figure 17:
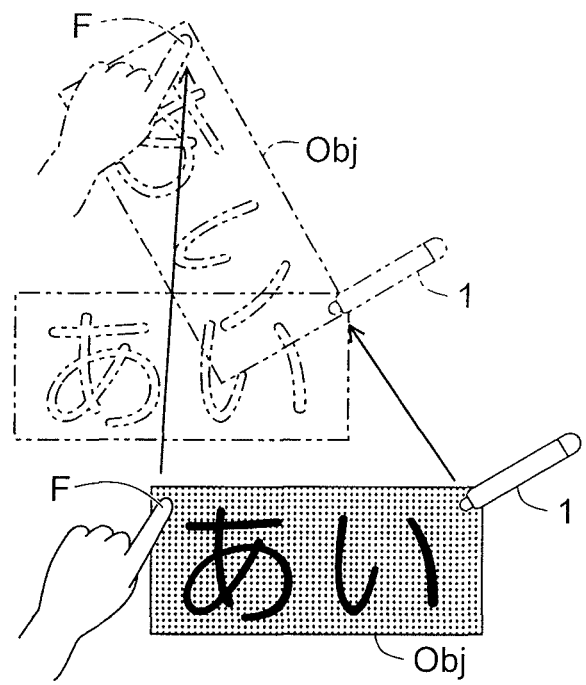
FIG. 17 is a diagram showing a status of a cooperative operation editing a displayed object by touching with a plurality of directing subjects (electronic pen or finger) simultaneously.
Figure 18:
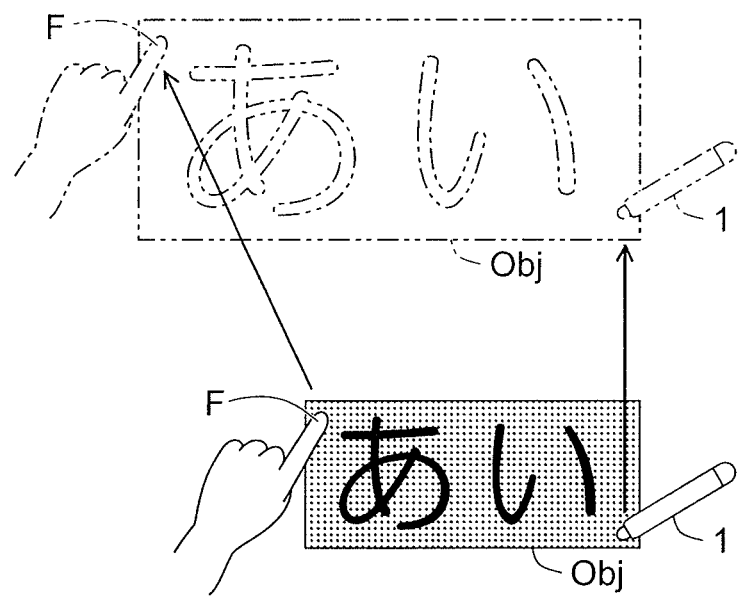
FIG. 18 is a diagram showing a status of a cooperative operation editing a displayed object by touching with a plurality of directing subjects (electronic pen or finger) simultaneously.

FIG. 17 and FIG. 18 are diagrams showing status of a cooperative operation editing a displayed object by touching with a plurality of directing subjects (the electronic pen 1 or a finger F) simultaneously. In order to edit a displayed object by touching the displayed object with a plurality of directing subjects, the drawing controller 17 of the controlling device 6 uses the touch position of the first directing subject that touched the displayed object first as an operation starting point, and uses the touch position of the second directing subject that touched the displayed object second as an operation action point. The drawing controller 17 generates drawing information of the displayed object and displayed it on the screen based on the absolute displacement amount of the operation starting point due to movement of the first directing subject and the relative displacement amount of the operation action point with respect to the operation starting point due to movement of the second directing subject.

Here, the first directing subject that sets the operation starting point is the electronic pen 1, and the second directing subject that sets the operation action point is a finger F. However, the second directing subject may be another electronic pen 1.

In the example shown in FIG. 17, in a rotation mode, parallel shift is performed to the displayed object corresponding to movement of the electronic pen 1 that sets the operation starting point, and rotation is performed to the displayed object corresponding to movement of a finger F that sets the operation action point. Here, the rotation of the displayed object is performed around the operation starting point, that is, the touch position of the electronic pen 1.

In the example shown in FIG. 18, in an enlargement or shrinkage mode, parallel shift is performed to the displayed object corresponding to movement of the electronic pen 1 that sets the operation starting point, and enlargement or shrinkage is performed to the displayed object corresponding to movement of a finger F that sets the operation action point. Here, when the relative distance between the electronic pen 1 and the finger F becomes large, the displayed object is enlarged. When the relative distance between the electronic pen 1 and the finger F becomes small, the displayed object is shrunk.

Also, another example is possible where the operation starting point and the operation action point are set in the same manner as described above; drawing information of the displayed object is continuously generated and displayed on the screen based on the relative displacement amount of the operation action point with respect to the operation starting point due to movement of the second directing subject; and the generation of the drawing information of the displayed object is ended when the second directing subject is separated from the touch surface. With this, the status of editing the displayed object is sequentially displayed on the screen corresponding to the movement of the second directing subject, which makes it possible for a user to perform an operation while watching the status of editing the displayed object.

Figure 19:
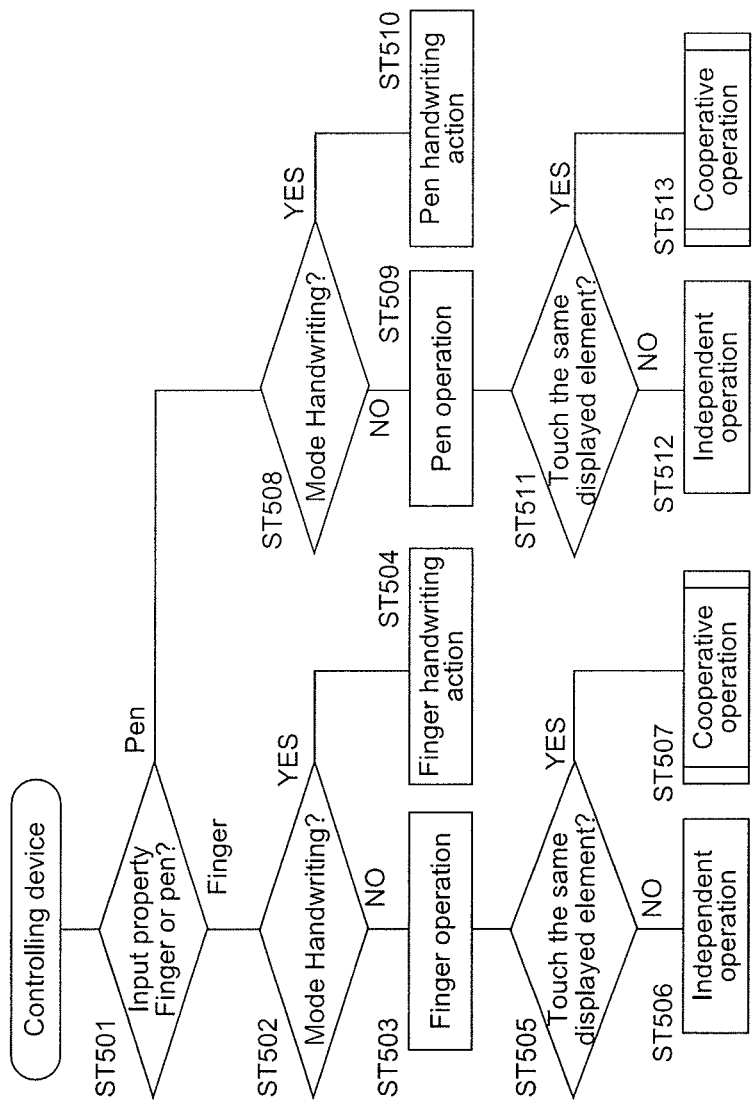
FIG. 19 is a flowchart of processing steps in the controlling device shown in FIG. 16.

FIG. 19 is a flowchart of processing steps in the controlling device 6 shown in FIG. 16. Here, the processing is classified into four kinds, that is, finger operation (ST503), finger handwriting action (ST504), pen operation (ST509), and pen handwriting action (ST510) based on whether the directing subject that performed the touch operation is the electronic pen 1 or a finger F and further whether it is in a handwriting mode or not. In the finger handwriting action, drawing is performed in the input detection position based on the handwriting properties (color, thickness, and line kind) set for a finger in advance. In the pen handwriting action, drawing is performed in the input detection position based on the handwriting properties (color, thickness, and line kind) set for each of the plural electronic pens 1 in advance.

In the finger operation (ST503) and the pen operation (ST509), when the electronic pen 1 and a finger F touch the same displayed object, the processing proceeds to cooperative operation (ST507, ST513). When the electronic pen 1 and a finger F do not touch the same displayed object, the processing proceeds to independent operation (ST506, ST512).

In the independent operation, the operation is performed to the displayed object in accordance with the operation mode selected from the menu based on the pen input and the finger input. For example, the operation relates to control of the application including rotation, movement, enlargement, and shrinkage processes to the displayed object, color change of the displayed object, selection of the displayed object, menu display, and the like.

Figure 20:
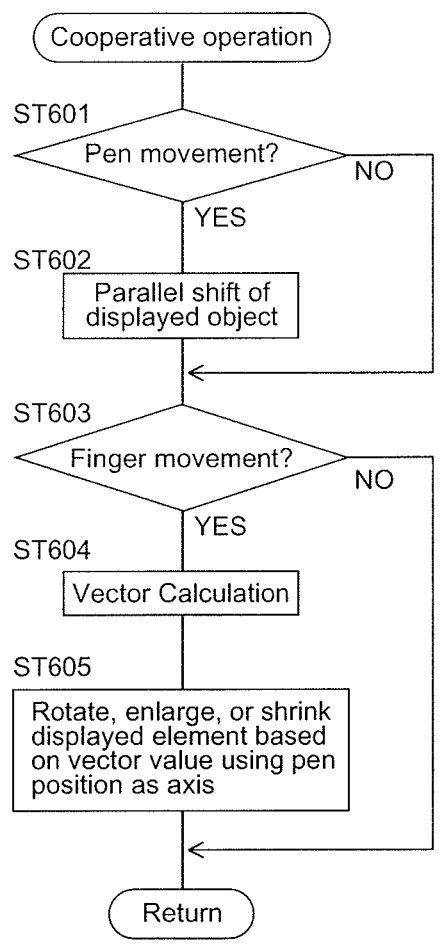
FIG. 20 is a flowchart of processing steps of a cooperative operation with an electronic pen and a finger shown in FIG. 19.

FIG. 20 is a flowchart of processing steps of a cooperative operation with an electronic pen 1 and a finger F shown in FIG. 19. First, when movement of the electronic pen 1 is detected (ST601), a parallel shift process is performed to the displayed object (ST602). Next, when movement of a finger F is detected (ST603), a vector calculation is performed based on the movement direction and the movement amount of the finger F (ST604), and a process such as rotation, enlargement, or shrinkage is performed to the displayed object based on the vector value using the touch position of the electronic pen 1 as the pivot point (ST605).

As described above, it is possible to separately use a plurality of electronic pens 1 by setting the properties differently. Thus, when images drawn separately by a plurality of electronic pens 1 overlap, there is a problem regarding how to draw the overlapping portion of both images.

FIGS. 21A and 21B, and FIGS. 22A and 22B are diagrams showing status of drawing a line with a plurality of electronic pens 1 shown in FIG. 1. When a new image is drawn so as to overlap with the previously drawn image, the drawing controller 17 of the controlling device 6 draws the overlapping portion of both images based on the drawing rule designated in advance. The electronic pen 1 has the operation switch (drawing rule designator) 44 that allows a user to designate the drawing rule, and the information of the drawing rule designated by this operation switch is transmitted to the controlling device 6.

Alternatively, the drawing rule may be selected and designated by the menu displayed on the touch surface 2 by the displaying device 5.

Figure 21A:
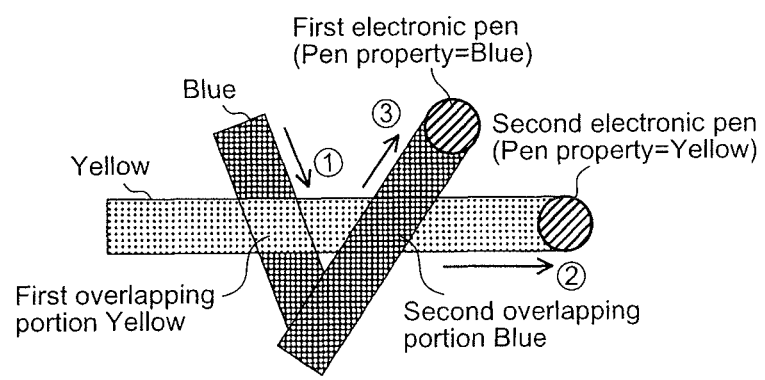
FIGS. 21A and 21B are diagrams showing a status of drawing a line with a plurality of electronic pens shown in FIG. 1.
Figure 21B:
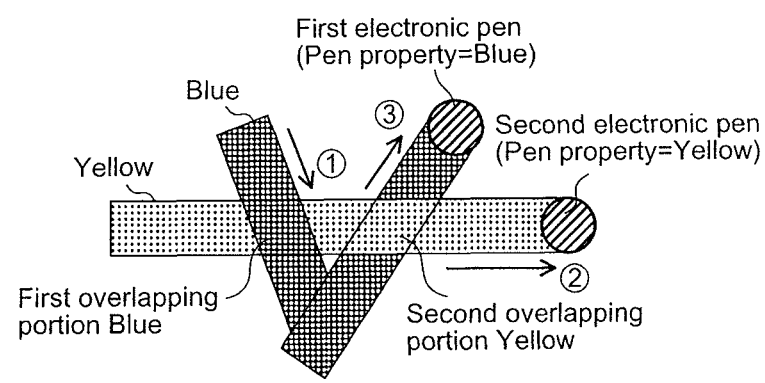

As shown in FIG. 21A and FIG. 21B, the drawing rule relates to overwrite processing in which the overlapping portion of an image previously drawn based on the first drawing conditions and a new image to be drawn based on the second drawing conditions is drawn based on the second drawing conditions of the new image. In the example shown in the drawing, the drawing conditions are a drawing color.

When performing of the overwrite processing is designated, the overlapping portion of the previously drawn image and a new image to be drawn is replaced with the color of the new image as shown in FIG. 21A. Specifically, the original blue color is replaced with yellow in the first overlapping portion, and the original yellow color is replaced with blue in the second overlapping portion. When non-performing of the overwrite processing is designated, the color of the overlapping portion of the previously drawn image and a new image to be drawn is left as it is as shown in FIG. 21B.

Figure 22A:
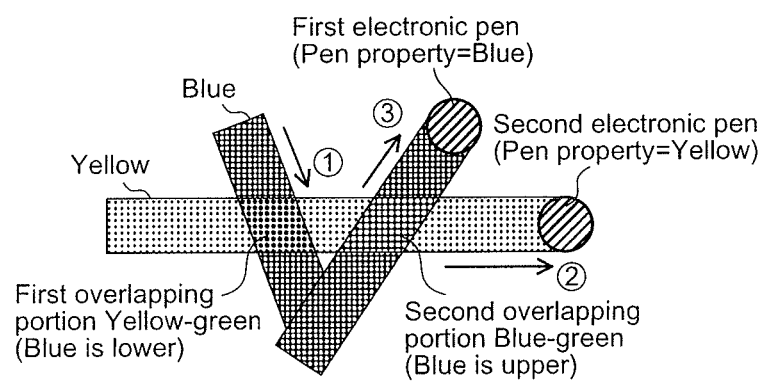
FIGS. 22A and 22B are diagrams showing a status of drawing a line with a plurality of electronic pens shown in FIG. 1.
Figure 22B:
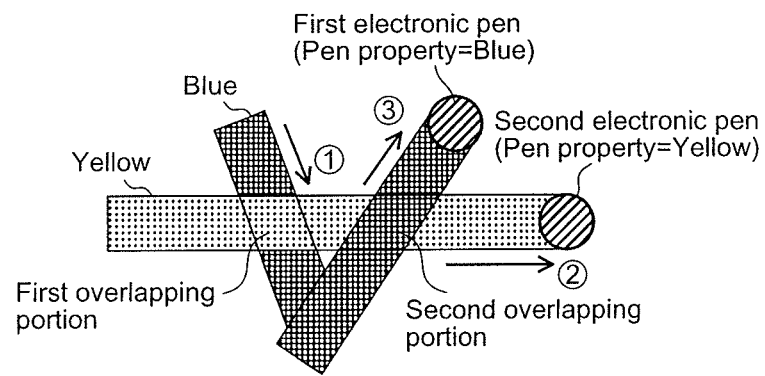

As shown in FIG. 22A and FIG. 22B, the drawing rule relates to superimposing processing in which the overlapping portion of the image previously drawn based on the first drawing conditions and a new image to be drawn based on the second drawing conditions is drawn based on other conditions obtained by modifying both the first drawing conditions and the second drawing conditions by a designated ratio. In the example shown in the drawing, the drawing conditions are a drawing color. As for the modification by the designated ratio, an example of performing an averaging process will be explained.

When performing of the superimposing processing is designated, the overlapping portion of the previously drawn image and a new image to be drawn is replaced with a mixed color in which both the drawing colors are averaged as shown in FIG. 22A. When non-performing of the superposing processing is designated, the color of the overlapping portion is replaced with the color of a new image to be drawn as shown in FIG. 22B. This is similar to the overwrite processing shown in FIG. 21A.

Further, it is possible to set the mixture ratio of the colors so as to emphasize the newly drawn image. Specifically, the mixed color is calculated by performing weighted average with a weighting factor based upon the first drawing color of the previously drawn image and the second drawing color of the newly drawn image.

In the first overlapping portion, the blue line previously drawn with the blue electronic pen 1 and the yellow line newly drawn with the yellow electronic pen 1 are superposed, and the color of the overlapping portion is replaced with a yellow-green color having a mixture ratio (yellow:blue) of 6:4 so as to emphasize the newly drawn yellow color. In the second overlapping portion, the yellow line previously drawn with the yellow electronic pen 1 and the blue line newly drawn with the blue electronic pen 1 are superposed, and the color of the overlapping portion is replaced with a blue-green color having a mixture ratio (blue:yellow) of 6:4 so as to emphasize the newly drawn blue color.

With this, a user can easily recognize that two lines were drawn with separate electronic pens 1 of different colors. Further, a user can easily recognize which line was drawn later among the two lines intersecting one another by changing the color of the overlapping portion based on the temporally first or next relationship.

The mixture ratio of the two colors may be set in proportion to the ratio of the line thicknesses. Further, when another line intersects the portion where two lines intersect and the original color is replaced with a mixed color, the color of the intersecting portion may be replaced with a color of mixing the original mixture color and a new color. This color replacement may be performed every time the lines intersect. Furthermore, when the electronic pen 1 is in an eraser mode, normally a newly drawn portion is deleted. Another configuration, however, is possible where various deleting modes can be designated. For example, the density of the newly drawn portion can be thinned by selecting the deleting ratio, or a part of the newly drawn portion can be deleted based on a pattern to be deleted by selecting such a pattern to be deleted.

In editing the image of the displayed object, a special function may be assigned to a case where a plurality of electronic pens 1 touch a single displayed object simultaneously. For example, it may be arranged that image processing (highlighting, emphasizing, color changing, etc.) of the displayed object is performed when the controlling device 6 detects a simultaneous touch of the plural electronic pens 1. Alternatively, it may be arranged that the property (for example, drawing color) of the electronic pens 1 is changed at random when the controlling device 6 detects a simultaneous touch of the plural electronic pens 1. With this, a change (interaction) of the displayed object that a user does not expect occurs, resulting in effects such as clues or triggers of ideas at the time of brainstorming or studying design.

The electronic pen system according to the present invention has an effect that makes it possible to correctly identify a directing subject that performed a touch operation as either an electronic pen or a finger. It is useful as an electronic pen system and the like that displays images on a touch surface of a touch panel corresponding to touch operations performed by an electronic pen and a finger to the touch surface.

The electronic pen system according to the present invention has an effect that makes it possible to equally, separately and concurrently use an electronic pen and a finger. It is useful as an electronic pen system and the like that displays images on a touch surface of a touch panel corresponding to touch operations performed by an electronic pen and a finger to the touch surface.

The electronic pen system according to the present invention has an effect that makes it possible for a user to use each of a plurality of electronic pens while changing its property as needed. It is useful as an electronic pen system and the like that makes it possible to use a plurality of electronic pens separately and simultaneously.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention. Further, all or any ones of the described features can be utilized together in a single electronic pen system.

What is claimed is:
1. An electronic pen system comprising:
an electronic pen;
a touch panel body having a touch surface on which a touch operation is performed by the electronic pen or by a finger;
a position detecting device that detects a touch position on the touch surface of the touch panel where the touch operation is performed; and
a controller that receives position detection information on the touch position from the position detecting device and determines whether the touch operation is performed by the electronic pen or by the finger,
the electronic pen comprising:
a grip portion that is grippable by a user's hand;
a pen tip portion that is pressed onto the touch surface by a touch operation of the electronic pen;
a touch condition detector that detects a touch of the pen tip portion with the touch surface;
a pen information transmitter that transmits predetermined pen information to the controller when the touch condition detector detects the touch of the pen tip portion with the touch surface; and
a connecting switch that electrically connects the pen tip portion and the grip portion so that the user's hand is brought into electrical continuity with the pen tip portion through the grip portion when the touch condition detector detects the touch of the pen tip portion with the touch surface;
wherein the controller determines that the touch operation is performed by the electronic pen when the controller receives the position detection information from the position detecting device after receiving the pen information from the electronic pen, while the controller determines that the touch operation is performed by the finger when the controller receives the position detection information from the position detecting device without receiving the pen information from the electronic pen.

2. The electronic pen system according to claim 1, further comprising a switch controller that turns the connecting switch ON when a predetermined period of time passes after the touch condition detector detects the touch of the pen tip portion with the touch surface.

3. The electronic pen system according to claim 1, further comprising a switch controller that turns the connecting switch OFF when the touch condition detector does not detect the touch of the pen tip portion with the touch surface for a predetermined period of time.

4. The electronic pen system according to claim 1, further comprising:
a first mechanical switch that comprises the touch condition detector;
a second mechanical switch that comprises the connecting switch; and
a switch operating mechanism that performs ON-OFF operation of the first mechanical switch and the second mechanical switch in conjunction with displacement of the tip portion of the pen at the time of a touch operation,
wherein the switch operating mechanism turns the first mechanical switch ON in conjunction with retraction displacement of the tip portion of the pen corresponding to pressing the tip portion of the pen onto the touch surface, and subsequently turns the second mechanical switch ON.

5. The electronic pen system according to claim 1, further comprising an operating unit that always keeps a mechanical switch, comprising the connecting switch, ON by a user's operation.

6. The electronic pen system according to claim 1, wherein the electronic pen further comprises a displacement amount detector that comprises the touch condition detector and detects a displacement amount of the tip portion of the pen corresponding to pressing the tip portion of the pen onto the touch surface, and pen information, to which the displacement amount of the tip portion of the pen detected by the displacement amount detector is added, is transmitted to the controller, and
wherein the controller performs a predetermined process corresponding to the displacement amount of the tip portion of the pen obtained by receiving the pen information from the electronic pen.

7. The electronic pen system according to claim 1, wherein the electronic pen does not transmit pen information when, after detection results by the touch condition detector changes from a touch condition to a non-touch condition, another touch condition is detected before the non-touch condition has been detected for a predetermined period of time, and
wherein when the controller detects a starting point of a new stroke input after the controller detects an end point of a stroke input where a series of position detection information by consecutive touch operations disappears, the controller determines that the new stroke input was performed by the same directing subject which performed a proximate stroke input when the two stroke inputs satisfy predetermined proximity conditions.

8. The electronic pen system according to claim 7, wherein the proximity conditions are set based on either one or both of the elapsed time from detection of an end point of a stroke input to detection of a starting point of a new stroke input and the spacing distance between an end point of a stroke input and a starting point of a new stroke input.

9. The electronic pen system according to claim 1, wherein when the controller detects a starting point of a new stroke input after the controller detects an end point of a stroke input where a series of position detection information by consecutive touch operations disappears, the controller determines that the new stroke input was performed by the same directing subject which performed a proximate stroke input when the two stroke inputs satisfy predetermined proximity conditions, and the controller causes the displaying device to display a confirmation screen where a user designates a directing subject in a case where there is no previous stroke input that satisfies predetermined proximity conditions.

10. The electronic pen system according to claim 1, wherein
the electronic pen transmits pen information indicating a non-touch condition to the controller when detection results by the touch condition detector changes from a touch condition to a non-touch condition, and
wherein when the controller receives the pen information indicating a non-touch condition from the electronic pen substantially at the same time as the controller detects an end point of a stroke input, the controller determines that the stroke input is by the electronic pen, and when the controller does not receive the pen information from the electronic pen substantially at the same time as the controller detects an end point of a stroke input, the controller determines that the stroke input is by a finger.

11. An electronic pen system comprising:
an electronic pen;
a touch panel body having a touch surface on which a touch operation is performed by the electronic pen or by a finger;
a position detecting device that detects a touch position on the touch surface of the touch panel where the touch operation is performed; and
a controller that receives position detection information of the touch position from the position detecting device and determines whether the touch operation is performed by the electronic pen or by the finger,
the controller comprising:
a first controller that performs predetermined pen input processing corresponding to a touch operation by the electronic pen; and
a second controller that performs predetermined finger input processing corresponding to a touch operation by the finger,
wherein:
the controller concurrently performs the pen input processing of the first controller and the finger input processing of the second controller,
the electronic pen transmits pen information to the controller at the time of a touch operation, and
the controller determines that the stroke input is by the electronic pen or a finger depending on whether the controller receives the pen information from the electronic pen substantially at the same time as the controller receives the position detection information from the position detecting device.

12. The electronic pen system according to claim 11, wherein
the finger input processing performed in the second controller includes at least one of moving, rotating, enlarging, and shrinking a displayed object.

13. The electronic pen system according to claim 11, wherein
the electronic pen comprises:
a grip portion that is grippable by a user's hand;
a pen tip portion that is pressed onto the touch surface by a touch operation of the electronic pen;
a touch condition detector that detects a touch of the pen tip portion with the touch surface;
a pen information transmitter that transmits predetermined pen information to the controller when the touch condition detector detects the touch of the pen tip portion with the touch surface; and
a connecting switch that electrically connects the pen tip portion and the grip portion so that the user's hand is brought into electrical continuity with the pen tip portion through the grip portion when the touch condition detector detects the touch of the pen tip portion with the touch surface;
wherein the controller determines that the touch operation is performed by the electronic pen when the controller receives the position detection information from the position detecting device after receiving the pen information from the electronic pen, while the controller determines that the touch operation is performed by the finger when the controller receives the position detection information from the position detecting device without receiving the pen information from the electronic pen.

14. An electronic pen system comprising:
an electronic pen;
a touch panel body having a touch surface on which a touch operation is performed by the electronic pen or by a finger;
a position detecting device that detects a touch position on the touch surface of the touch panel where the touch operation is performed; and
a controller that receives position detection information of the touch position from the position detecting device and determines whether the touch operation is performed by the electronic pen or by the finger,
the controller comprising:
a first controller that performs predetermined pen input processing corresponding to a touch operation by the electronic pen; and
a second controller that performs predetermined finger input processing corresponding to a touch operation by the finger,
wherein:
the controller concurrently performs the pen input processing of the first controller and the finger input processing of the second controller,
the first controller performs a drawing process corresponding to a touch operation by the electronic pen and a property set in the electronic pen, the second controller performs an editing process to a displayed object corresponding to a touch operation by the finger, and
the controller has a finger drawing mode in which a touch operation by the finger is considered as a touch operation by the electronic pen, in response to a user's command, and the first controller performs a drawing process corresponding to a touch operation by the finger based on a standard property in the finger drawing mode.

15. An electronic pen system comprising:
a plurality of electronic pens, each of the electronic pens has identification information;
a touch panel body having a touch surface on which a touch operation is performed by at least one of the electronic pens;
a position detecting device that detects a touch position of at least one of the electronic pens on the touch surface;
a display device that displays a predetermined image by using the touch surface as a display screen; and
a controller that causes the display device to display an image corresponding to position detection information obtained by the position detecting device,
wherein each of the electronic pens has a property selector that allows a user to select property information, and pen information including the property information selected by the property selector and the identification information of the each of the electronic pens is transmitted to the controller, and
wherein the controller causes the display device to display an image corresponding to the property information obtained based on the pen information received from each electronic pen.

16. The electronic pen system according to claim 15, wherein
each electronic pen transmits pen information to the controller at the time of a touch operation, and
wherein the controller determines from which electronic pen the position detection information received from the position detecting device came, based on the pen information received substantially at the same time as the controller received the position detection information from the position detecting device.

17. The electronic pen system according to claim 15, wherein
the controller device includes a drawing controller that draws an overlapping portion of a previously drawn image and a newly drawn image based on a drawing rule designated in advance when the new image is drawn so as to be superimposed on the previously drawn image, and
wherein the electronic pen includes a drawing rule designator that allows a user to designate a drawing rule, and information about the drawing rule designated by the drawing rule designator is transmitted to the controller.

18. The electronic pen system according to claim 15, wherein
the drawing rule relates to an overwriting process that draws the overlapping portion of the previously drawn image and the newly drawn image based on drawing conditions of the newly drawn image.

19. The electronic pen system according to claim 15, wherein
the drawing rule relates to a superimposing process that draws the overlapping portion of the previously drawn image and the newly drawn image based on drawing conditions obtained by modifying the drawing conditions of both the previously drawn image and the newly drawn image by a designated ratio.

* * * * *